UNITED STATES PATENT OFFICE.

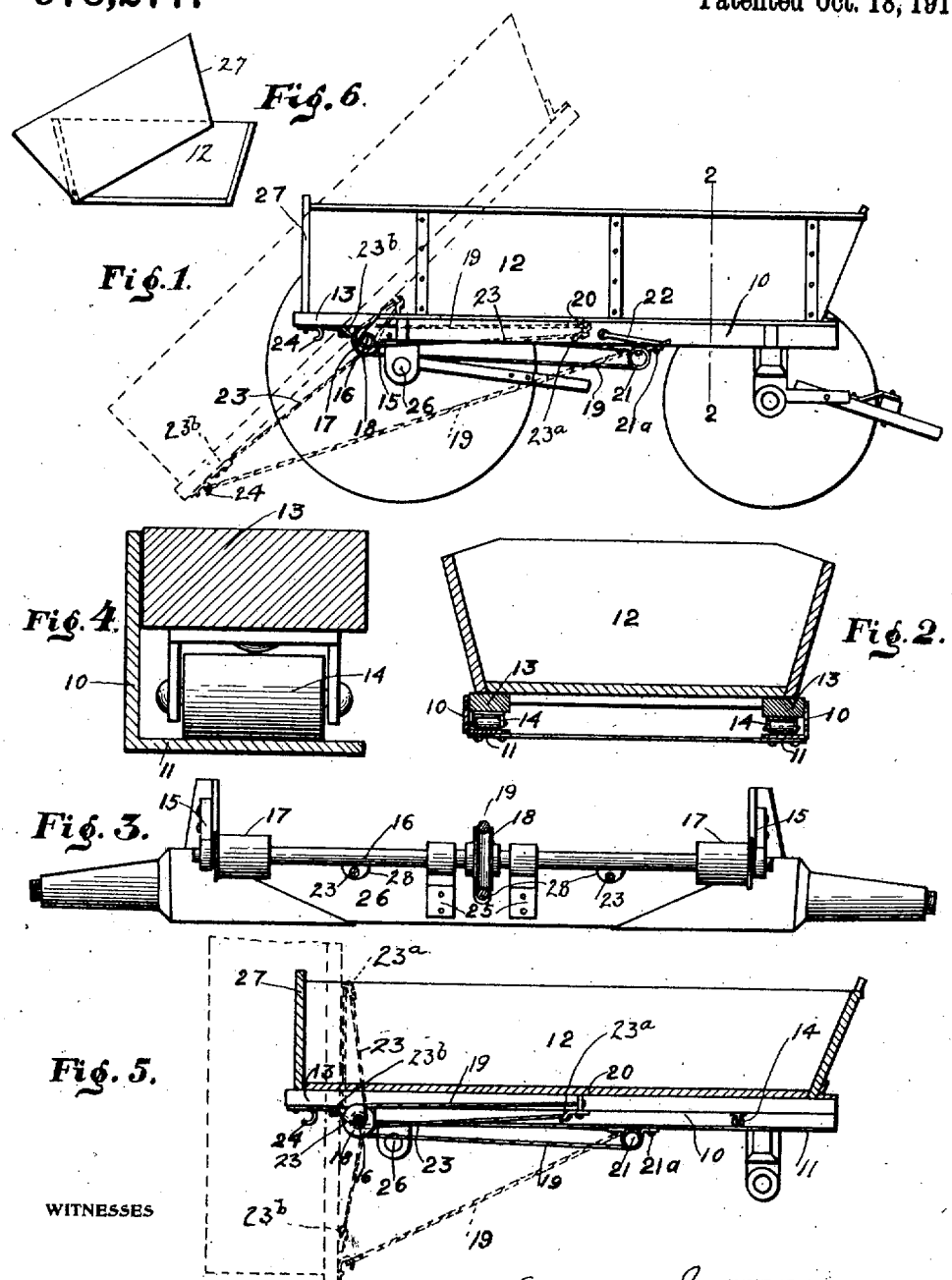

EVERETT R. JONES AND WALTER A. YOCKEY, OF SPOKANE, WASHINGTON.

DUMPING-WAGON.

973,277.  Specification of Letters Patent.  Patented Oct. 18, 1910.

Application filed February 23, 1910. Serial No. 545,511.

*To all whom it may concern:*

Be it known that we, EVERETT R. JONES and WALTER A. YOCKEY, citizens of the United States, residing at Spokane, in the county of Spokane and State of Washington, have invented certain new and useful Improvements in Dumping-Wagons, of which the following is a specification.

This invention relates to that class of dumping wagons in which the wagon box is movable longitudinally on the truck, the wagon box being placed in dumping position by being moved rearwardly until it swings or tilts downwardly.

It is the object of the invention to provide improved means for guiding the wagon box in its movement to and from dumping position, and also to provide simple and easily operated means for effecting such movement of the wagon box.

Another object of the invention is to provide a structure by which the wagon box is located nearer the ground than in ordinary dumping wagons.

The invention also has for its object to provide a dumping wagon in which the wagon box can be swung into perpendicular position to dump.

With these and other objects in view, as will appear more fully hereinafter, the invention consists in certain novel features of construction and combination of parts to be hereinafter described and claimed.

In order that the invention may be fully understood, reference is had to the accompanying drawing, in which—

Figure 1 is a side elevation of a wagon embodying our invention. Fig. 2 is a cross section on the line 2—2 of Fig. 1. Fig. 3 is a rear end view of the truck. Fig. 4 is an enlarged detail view of one of the roller supports. Fig. 5 is a longitudinal section of the wagon. Fig. 6 is a rear end view of the wagon box showing the end gate.

The invention may be applied to any ordinary wagon truck on which is rigidly mounted a metal bed or frame, the sides of which are angle irons having one of their flanges 10 vertically and upwardly presented, these flanges being on the outside. The horizontal flanges 11 of these angle irons form a track on which the wagon box 12 is mounted for longitudinal travel, the angle irons extending lengthwise of the wagon.

The wagon box 12 is constructed in a similar manner as any ordinary wagon box, except that its sides are flared, which makes it wider at the top, and enables it to hold a given amount of material with a less height than the ordinary wagon box requires.

On the bottom of the sills 13 of the wagon box, near its front end, are mounted rollers 14 which support this end of the wagon box, and said rollers are so located as to travel on the track formed by the flanges 11.

The vertical flanges 10, at the rear end of the wagon, support brackets 15 which carry a shaft 16 extending transversely of the wagon. On this shaft are mounted rollers 17 on which the rear end of the wagon box is supported. On the shaft 16 is also mounted a sheave 18 over which a cable or chain 19 is run, one end of which is fastened to the bottom of the wagon box about midway between its front and rear ends, as indicated at 20. The other end of the cable or chain is secured to a roller 21 on which it is adapted to be wound, the roller thus serving as a windlass. The roller is supported in brackets 21ª secured to the bottom of the flanges 11, about midway between the front and rear ends thereof, or near their front ends, in such a position that the wagon wheels will not interfere with the operation of the roller. A pivoted pawl 22 is provided for locking the roller against unwinding.

In operation, a suitable handle will be fitted on the roller 21, and upon rotating the latter, the cable or chain 19 is wound on or off the roller. Upon winding up the cable or chain, the wagon box 12 is pulled in the direction of the rear end of the wagon, until it drops or tilts downwardly at said end into dumping position, as shown by dotted lines in Fig. 1. To prevent the wagon box from falling away or slipping entirely from the truck, chains or cables 23 are provided, they being located near the outer edges of the wagon box, and fastened thereto about midway between the front and rear ends thereof, as indicated at 23ª, from which they pass to the rear end of the wagon box under the shaft 16, and are fastened to the rear end of the wagon box as indicated at 23ᵇ.

It is sometimes necessary to have the wagon box dumped in perpendicular position, as shown by dotted lines in Fig. 5. To accomplish this, a hook 24 is provided on the rear end of the wagon box, and when the latter has been tilted as already described, that end of the cable or chain 19 which is fastened to the wagon box is disconnected, and connected to the hook 24. The roller 21 is then operated to further wind up the cable or chain until it draws the wagon body to perpendicular position.

By the arrangement of parts herein described, a strong and durable structure is had.

On opposite sides of the sheave 18 are braces 25 which are fastened to the rear axle 26, and serve to support the shaft 16 intermediate its ends.

As one of the objects of this invention is to bring the wagon box as low as possible to the ground, it will be seen that the saving in using angle irons for supporting the wagon box will be considerable, as over a method of a beam where the thickness will be many times that of the flanges of the angle irons on which the wagon box rests; also the flaring sides serve to accomplish the above. The wagon box fits between the flanges 10 of the angle irons, whereby it is guided and prevented from slipping off sidewise, when the wagon is operated on a hillside or slope.

An end gate 27 is provided which is hinged at the side and is thrown open by being swung outwardly and upwardly.

To permit the chains or cables 19 and 23 to pass the rear axle 26, openings 28 are cut therein as shown in Fig. 3.

We claim:

A dumping wagon comprising a truck, a wagon box mounted for longitudinal movement thereon, a winding device mounted on the truck intermediate the ends thereof, a sheave mounted on the rear end of the truck, a hauling line connected at one of its ends to the winding device, and passing rearwardly to the sheave and over the same, and devices on the wagon box in front and to the rear of the sheave for connection of the other end of the line to the wagon box.

In testimony whereof we affix our signatures in presence of two witnesses.

EVERETT R. JONES.
WALTER A. YOCKEY.

Witnesses:
R. L. CHAFFIN,
H. E. SMITH.